(12) United States Patent
Aono et al.

(10) Patent No.: US 8,312,211 B2
(45) Date of Patent: Nov. 13, 2012

(54) DISK ARRAY APPARATUS, METHOD FOR APPLICATION OF CONTROL FIRMWARE, AND CONTROLLING UNIT FOR CONTROLLING APPLICATION OF CONTROL FIRMWARE

(75) Inventors: Yoshihisa Aono, Kawasaki (JP); Shoichi Murano, Kawasaki (JP); Nobuyuki Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 12/363,151

(22) Filed: Jan. 30, 2009

(65) Prior Publication Data

US 2009/0292873 A1 Nov. 26, 2009

(30) Foreign Application Priority Data

May 23, 2008 (JP) ................................. 2008-135401

(51) Int. Cl.
*G06F 12/08* (2006.01)
(52) U.S. Cl. ................ 711/112; 711/114; 711/E12.019; 717/168
(58) Field of Classification Search ........................ None
See application file for complete search history.

(56) References Cited

U.S. PATENT DOCUMENTS

| | | | |
|---|---|---|---|
| 5,544,339 A | | 8/1996 | Baba |
| 5,835,761 A | | 11/1998 | Ishii et al. |
| 6,209,060 B1* | | 3/2001 | Machida ........................ 711/114 |
| 6,728,833 B2* | | 4/2004 | Pruett et al. ................... 711/114 |
| 6,816,950 B2* | | 11/2004 | Nichols ......................... 711/162 |
| 7,032,218 B2* | | 4/2006 | Shirasawa et al. ............. 717/168 |
| 7,203,723 B2* | | 4/2007 | Ogawa ........................... 709/203 |
| 7,231,493 B2* | | 6/2007 | Nguyen et al. ................. 711/114 |
| 7,343,519 B2* | | 3/2008 | Schmitz .......................... 714/23 |
| 7,376,756 B2* | | 5/2008 | Delaney et al. ..................... 710/5 |
| 7,752,387 B2* | | 7/2010 | Elliott et al. .................. 711/114 |
| 2002/0138567 A1* | | 9/2002 | Ogawa ........................... 709/203 |
| 2003/0016946 A1 | | 1/2003 | Fakhruddin |
| 2003/0163640 A1* | | 8/2003 | Pruett et al. ................... 711/114 |
| 2003/0212856 A1* | 11/2003 | | Nichols ......................... 711/114 |
| 2005/0071559 A1 | | 3/2005 | Tamura et al. |
| 2005/0097236 A1* | | 5/2005 | Delaney et al. ................. 710/15 |
| 2005/0188170 A1 | | 8/2005 | Yamamoto |

(Continued)

FOREIGN PATENT DOCUMENTS

EP        0502724        9/1992

(Continued)

OTHER PUBLICATIONS

Japanese Patent Office Notice of Rejection mailed Mar. 2, 2010 for corresponding Japanese Patent Application No. 2008-135401.

(Continued)

*Primary Examiner* — Kevin Verbrugge
(74) *Attorney, Agent, or Firm* — Fujitsu Patent Center

(57) ABSTRACT

A disk array apparatus with a number of storage units aims at application of new control firmware to the storage units. The disk array apparatus includes a controlling unit controlling the storage units, which controlling unit includes a storing section storing control firmware to be applied; a monitoring section for monitoring a state of access to each storage unit to which the control firmware is to be applied; and an application instructing section instructing, on the basis of the result of the monitoring by the monitoring section, each the first storage unit to apply the first control firmware. In response to the instructing by the application instructing section, the control firmware is applied to each the storage unit.

18 Claims, 8 Drawing Sheets

U.S. PATENT DOCUMENTS

| | | | |
|---|---|---|---|
| 2005/0257081 A1* | 11/2005 | Schmitz | 714/5 |
| 2006/0015861 A1 | 1/2006 | Takata et al. | |
| 2006/0089980 A1 | 4/2006 | Nomura | |
| 2007/0055970 A1 | 3/2007 | Sakuda et al. | |
| 2007/0067563 A1* | 3/2007 | Smith et al. | 711/114 |
| 2007/0168571 A1* | 7/2007 | Ramsey et al. | 710/8 |
| 2007/0180293 A1 | 8/2007 | Takahashi | |
| 2007/0226413 A1* | 9/2007 | Elliott et al. | 711/114 |
| 2007/0233951 A1* | 10/2007 | Kawada et al. | 711/114 |
| 2008/0052506 A1* | 2/2008 | Iima et al. | 713/1 |
| 2008/0126784 A1* | 5/2008 | Iima et al. | 713/2 |

FOREIGN PATENT DOCUMENTS

| | | |
|---|---|---|
| JP | 4-279954 | 10/1992 |
| JP | 5-181611 | 7/1993 |
| JP | 6-119123 | 4/1994 |
| JP | 6-295238 | 10/1994 |
| JP | 7-44440 | 2/1995 |
| JP | 8-16408 | 1/1996 |
| JP | 2003-78872 | 3/2003 |
| JP | 2005-107645 | 4/2005 |
| JP | 2005-242555 | 9/2005 |
| JP | 2006-31312 | 2/2006 |
| JP | 2006-119941 | 5/2006 |
| JP | 2007-69368 | 3/2007 |
| JP | 2007-206766 | 8/2007 |

OTHER PUBLICATIONS

Japanese Patent Office Notice of Rejection mailed Jun. 8, 2010 for corresponding Japanese Patent Application No. 2008-135401.

* cited by examiner

_DISK ARRAY APPARATUS, METHOD FOR APPLICATION OF CONTROL FIRMWARE, AND CONTROLLING UNIT FOR CONTROLLING APPLICATION OF CONTROL FIRMWARE_

CROSS-REFERENCE TO RELATED APPLICATION(S)

This application is based upon and claims the benefit of priority of the prior Japanese Patent Application No. 2008-135401, filed on May 23, 2008, the entire contents of which are incorporated herein by reference.

FIELD

The embodiments discussed here relate to a technology to apply control firmware to a number of storage units included in a disk array apparatus.

BACKGROUND

In a disk array apparatus such as a Redundant Arrays of Inexpensive Disks (RAID) apparatus, it is important to improve the quality of storage units (e.g. a Hard Disk Drive (HDD), to detect failure in the early stage, and to solve problems when storing data requiring high reliability.

In relation to the above importance, in some cases, the control firmware of the HDDs needs to be updated to cope with problems at the worksite.

The completion of updating the firmware of the HDDs in a conventional disk array apparatus requires rebooting of the HDD.

For this reason, conventional disk array apparatuses update the control firmware when the disk array apparatus is powered off for maintenance or others.

There has been provided a technique, for an information processor such as a personal computer, of copying a basic input/output system program in accordance with an updating flag when the operating system is started, and a technique of updating the firmware of a printer when a print operation is completed or when a request to switch the power is issued (see Patent References 1 and 2 below).

[Patent Reference 1] Japanese Patent Application Laid-Open (KOKAI) No. HEI 8-16408
[Patent Reference 2] Japanese Patent Application Laid-Open (KOKAI) No. 2007-69368

As described above, a conventional disk array apparatus is incapable of updating control firmware of HDDs while the apparatus is in normal operation (working).

Therefore, even if the control firmware needs to be updated, the disk array apparatus has to wait for maintenance. Namely, the control firm has not been able to be occasionally updated.

Since a normal disk array apparatus includes from hundreds to thousands of HDDs, it takes a considerable time and workload for the operator to register the control firmware for updating into each individual HDD (i.e., to reboot each individual HDD).

SUMMARY

Accordingly, it is a requirement of the embodiments to provide a disk array apparatus in which an application instructing section included in the controlling unit that controls the storage units instructs, on the basis of the result of the monitoring by the monitoring section, each of the first storage units to apply the control firmware, and in response to the instructing by the application instructing section, the control firmware being applied to each of the first storage units.

As another requirement, there is provided a method for applying control firmware including: instructing, on the basis of the result of the monitoring, that the first control firmware is to be applied to each of the first storage units; and applying, in response to the instructing, the first control firmware stored in the storing to each of the first storage units.

As an additional requirement, a controlling unit for controlling application of control firmware includes the storing section, the monitoring section, and the application instructing section.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

Exemplary embodiments of the present invention will be described in detail based on the following figures, wherein.

DESCRIPTION OF EMBODIMENTS

Hereinafter, embodiments will now be described with reference to accompanying drawings.

(1) First Embodiment

Figure 1:
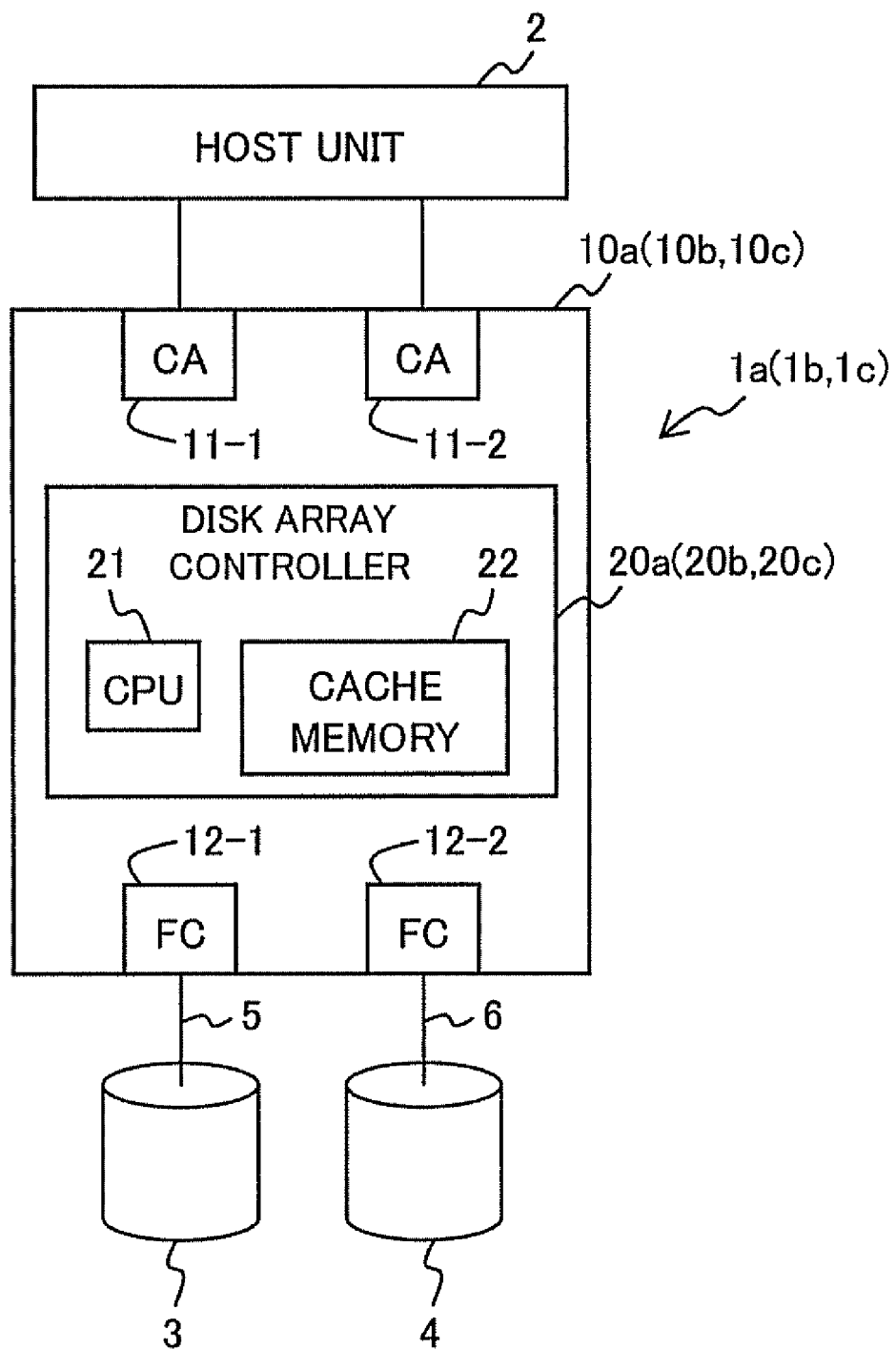
FIG. 1 is a block diagram schematically illustrating the configuration of a disk array apparatus according to first through third embodiments of the present invention.

First of all, description is made in relation to a disk array apparatus (e.g., a RAID apparatus) 1a according to the first embodiment of the present invention with reference to block diagram FIG. 1.

The disk array apparatus 1a, which is connected to host unit 2 serving as an upper unit, includes a number of storage units 3 and 4 that store data transmitted from the host unit 2, and a controlling unit (controller) 10a that controls the storage units 3 and 4.

For the sake of simplification, FIG. 1 illustrates two storage units 3 and 4. However, the disk array apparatus 1a includes a large number of HDDs (see FIG. 2 detailed below) constituting a RAID apparatus.

The host unit 2 issues, to the controlling unit 10a, a process request, such as a write request into and a read request from the storage units 3 and 4.

The controlling unit 10a includes Channel Adapters (CA) 11-1 and 11-2, Fiber Channels (FC) 12-1 and 12-2, and a disk array controller (a controller, a controlling section for controlling application of control firmware) 20a.

The CAs 11-1 and 11-2 function as interface controllers between the host unit 2 and the disk array controller 20a.

With this configuration, a process request from the host unit 2 is issued through the CAs 11-1 and 11-2 to the disk array controller 20a. A response from the disk array controller 20a is also transmitted through CAs 11-1 and 11-2 to the host unit 2.

FCs 12-1 and 12-2 function as interface controllers between the disk array controller 20a and the storage units 3 and 4. With this configuration, data and instructions (processing instructions) are transmitted and received through the FCs 12-1 and 12-2 between the disk array controller 20a and the storage units 3 and 4.

Figure 2:
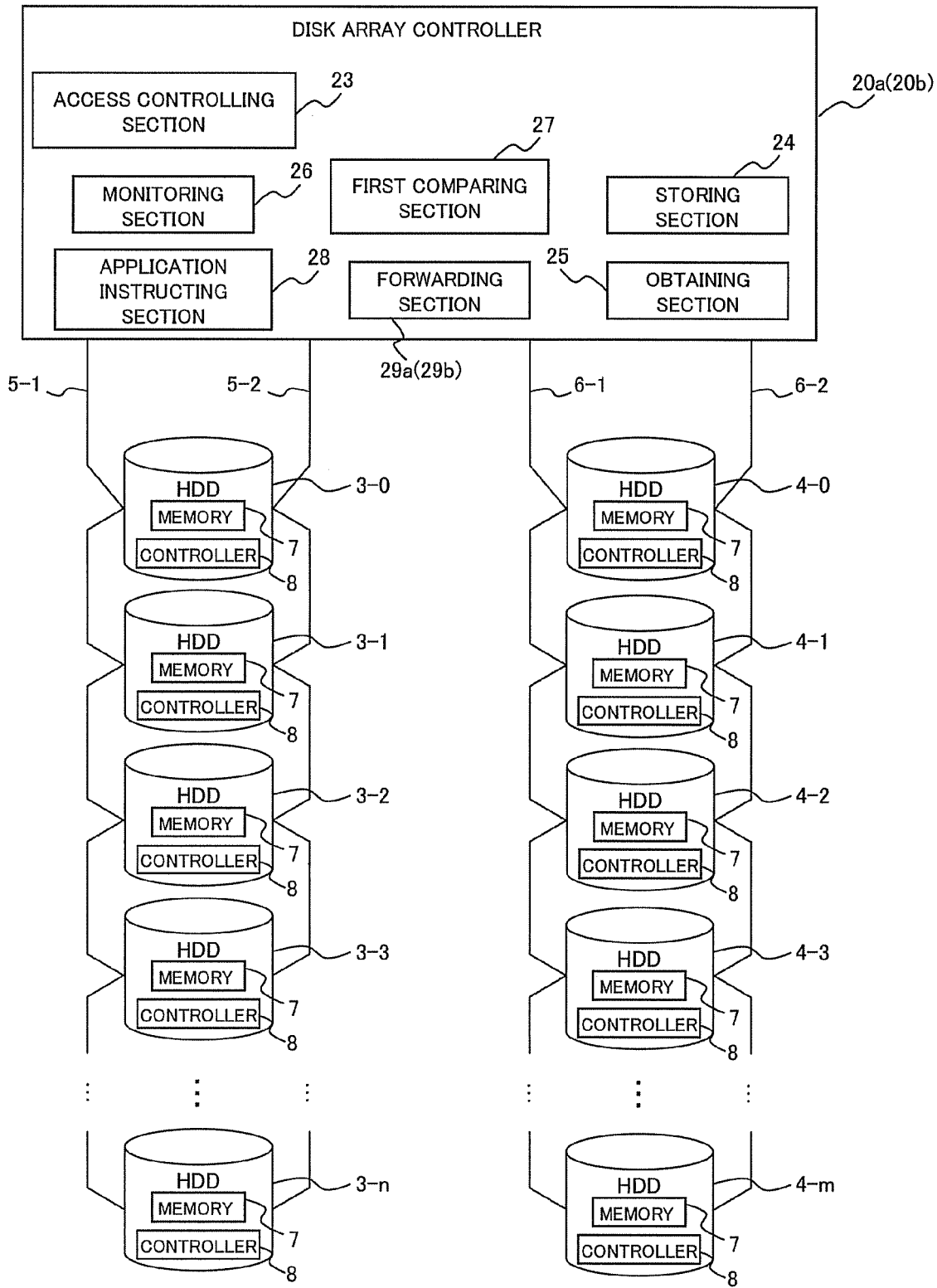
FIG. 2 is a diagram schematically illustrating the configuration of a main part of a disk array apparatus according to the first and the second embodiments.

The FC 12-1 is connected to the storage unit 3 through an access path 5, and the FC 12-2 is connected to the storage unit 4 through an access path 6. As illustrated in FIG. 2 to be detailed below, the access paths 5 and 6 are divided into a number of access paths 5-1 and 5-2 and a number of access paths 6-1 and 6-2, respectively.

The disk array controller 20a controls processes to be performed in the storage units 3 and 4 in response to process requests from the host 2, and otherwise independently instructs the storage units 3 and 4 to carry out processes.

Further, the disk array controller 20a includes a Central Processing Unit (CPU) 21 that controls a process to read data from and write data into the storage units 3 and 4, and a cache memory 22.

Here, the present invention does not limit the number of host units 2 to which the disk array apparatus 1a is connected, the number of controlling units 10a included in disk array apparatus 1a, and the number of storage units 3 and 4. In addition, the number of CAs 11-1 and 11-2 included in the controlling unit 10a and the number of FCs 12-1 and 12-2 included in the controlling unit 10a are not limited in the present invention.

The disk array apparatus 1a may be configured to be communicable with another disk array apparatus (not shown) having an identical or substantially identical configuration.

Next, the disk array controller 20a included in the disk array apparatus 1a of the first embodiment will now be detailed with reference to FIG. 2. For the sake of simplification, FIG. 2 illustrates the disk array controller 20a, a number of storage units (HDDs) 3-0 through 3-n and 4-0 through 4-m (where, n and m are integers of 4 or more), but omits the host unit 2, the CAs 11-1 and 11-2 and the FCs 12-1 and 12-2.

As depicted in FIG. 2, the disk array controller 20a includes an access controlling section 23, a storing section 24, an obtaining section 25, a monitoring section 26, a first comparing section 27, an application instructing section 28, and a forwarding section 29a.

The storing section 24 may be realized by the cache memory 22 or a memory (not shown) possessed by the CPU 21.

The access controlling section 23, the obtaining section 25, the monitoring section 26, the first comparing section 27, the application instructing section 28 and the forwarding section 29a may be realized through the execution of one or more specific programs (e.g., a control firmware application program to be detailed below) by the CPU 21 or by means of hardware. The same is applied to a forwarding section 29b, a second comparing section 30, and a storing processing section 31 that are to be described below.

The access controlling section 23 controls, in compliance with processing requests from the host unit 2 to the storage units (hereinafter called HDDs) 3-0 to 3-n and 4-0 to 4-m (hereinafter respectively represented by reference number 3 and 4 if there is no requirement to discriminate a storage unit from the others), access to the storage units 3 and 4 to, for example, read data in and read data from the storage units 3 and 4.

The storing section 24 stores control firmware for updating that is to be allied to HDDs 3 and 4.

The control firmware stored in the storing section 24 may be manually registered by the operator of the disk array apparatus 1a or may be automatically obtained via a network (not shown) such as the Internet. In either way, the storing section 24 stores the latest control firmware used for updating HDDs 3 and 4.

HDDs 3 and 4 are not always same in type, and therefore may operate under the control of different control firmware. In such a case, the storing section 24 has the same number of firmware pieces as the kinds of HDDs 3 and 4.

The storing section 24 stores a management table (not shown) that manages the state (normal operation or abnormal state) of operation, the kind of control firmware, and the version information of the control firmware of each of the HDDs 3 and 4.

These pieces of information stored in the management table may be directly registered by the operator or may be automatically obtained by the obtaining section 25.

Specifically, the obtaining section 25 obtains the state of operation, the kind of HDD, the kind of control firmware, the version information (information about control firmware) from each of all the HDDs 3 and 4 coupled to disk array controller 20a from the HDDs 3 and 4.

As a consequence, the storing section 24 retains these pieces of information obtained by the obtaining section 25 in the management table.

The monitoring section 26 monitors a state of access from the host unit 2 to each of the HDDs 3 and 4 to which the control firmware for updating stored in the storing section 24 are to be applied (i.e., the HDDs 3 and 4 to be updated). Namely, the monitoring section 26 monitors access to the HDDs 3 and 4 dealt with by the access controlling section 23.

The HDDs 3 and 4 that are to be updated are specified by the application instructing section 28, which will be explained in the detailed description made for the application instructing section 28.

The first comparing section 27 compares information (e.g., the version information or the date of creation) on the current firmware of the HDDs 3 and 4 which information is stored in the management table of the storing section 24 as information on the control firmware (i.e., the same in type as the current control firmware) for updating which firmware has been stored in the storing section 24.

In other words, the first comparing section 27 compares information about control firmware so that the application instructing section 28 specifies HDDs 3 and 4 that operate under control of control firmware older than the same kind of control firmware stored in the storing section 24 among all the HDDs 3 and 4.

The application instructing section 28 instructs, on the basis of the result of the monitoring by the monitoring section 26 in relation to states of access to the HDDs 3 and 4, application object HDDs 3 and 4 to apply the control firmware.

Specifically, the application instructing section 28 instructs application object HDDs 3 and 4 to be applied (hereinafter also called updating object HDDs 3 and 4) assigned by the operator to apply the control firmware. Otherwise, the application instructing section 28 assigns such updating object HDDs 3 and 4 on the basis of the result of the comparison by the first comparing section 27 and then instructs the assigned HDDs 3 and 4 to apply the control firmware.

If the determination of updating object HDDs 3 and 4 are based on the assignment of the operator, the operator specifies the updating object HDDs 3 and 4 with the ID numbers, the kinds, or the version information of the HDDs 3 and 4.

With these information pieces, the application instructing section 28 determines updating object HDDs 3 and 4 on the basis of input from the operator and information in the management table stored in the storing section 24.

If the application instructing section 28 determines updating object HDDs 3 and 4 on the basis of the result of comparison by the first comparing section 27, the application instructing section 28 assigns HDDs 3 and 4 the control firmware of which is older than the control firmware for updating stored in the storing section 24 to the updating object HDDs 3 and 4.

On the other hand, if the comparison by the first comparing section 27 concludes that the firmware in HDDs 3 and 4 are newer than or the same as that of the firmware stored in the storing section 24, the application instructing section 28 does not assign the HDDs 3 and 4 to be updating objects.

The present invention should by no means limit the determination of updating object HDDs 3 and 4 to being based on the operator's assignment or on the result of comparison by the first comparing section 27. As an alternative, the application instructing section 28 may follow an input from the operator, and may, with the absence of the input, automatically determine updating objects in accordance with the result of comparison by the first comparing section 27.

Further, the application instructing section 28 instructs such updating object HDDs 3 and 4 to apply the control firmware for updating (the updating instruction) if the result of the monitoring by the monitoring section 26 (i.e., the states of accesses from the host unit 2 to the HDDs 3 and 4) satisfies predetermined conditions.

Unless the result of the monitoring by the monitoring section 26 satisfies the predetermined conditions, the application instructing section 28 does not issue the application instruction.

Here, the predetermined conditions are that the host unit 2 has not accessed an HDD 3 or 4 continuously for a predetermined time period, or that the host unit 2 has accessed the HDD 3 or 4 less than a predetermined threshold for a predetermined time period. Under these conditions, the control firmware of HDDs 3 and 4 can be automatically updated in the background without hindering ordinary processes performed in response to requests from the host 2, that is, immediately. The predetermined conditions are not limited in the present invention, but are preferably set not to affect ordinary processes performed in response to requests from the host 2.

Namely, if it is judged that one or more of the HDDs 3 and 4 requires updating as the result of the comparison by the first comparing section 27, the application instructing section 28 automatically instructs the object HDDs 3 and 4 to update the control firmware, depending on the result of the monitoring by the monitoring section 26.

The disk array apparatus 1a has a number of access paths (also simply called paths) 5-1, 5-2, 6-1, and 6-2 between HDDs 3 and 4 and the disk array controller 20a through the FC 12-1 and 12-2.

Assuming that the access controlling section 23 uses the paths 5-1 and 6-1 for accesses from the host unit 2 (hereinafter, called the access paths from the host unit 2), the application instructing section 28 issues, via the other access paths 5-2 and 6-2, application instructions to the object HDDs 3 and 4.

For the application instruction to apply control firmware, the application instructing section 28 specifically instructs an object HDD 3 or 4 to rewrite the control firmware over the memory of the object HDD 3 or 4 and to reboot the object HDD 3 or 4.

The forwarding section 29a forwards the control firmware for updating stored in the storing section 24 to the updating object HDDs 3 and 4 determined by the application instructing section 28.

The forwarding section 29a forwards, via the access paths 5-2 and 6-2 different from the access paths 5-1 and 6-1 used for accesses from the host unit 2, the control firmware for updating to the updating object HDDs 3 and 4.

In response to assigning of the updating object HDDs 3 and 4 by the application instructing section 28 while the control firmware for updating is stored in the storing section 24, the forwarding section 29a successively forwards the control firmware to the assigned HDDs 3 and 4.

More specifically, the forwarding section 29a forwards the control firmware for updating to the updating object HDDs 3 and 4 at least prior to issuing of the application instruction to the same HDDs 3 and 4 from the application instructing section 28.

As depicted in FIG. 2, each of the HDDs 3 and 4 has a memory 7 and a controller 8.

The memory 7 is a nonvolatile memory arranged separately from, for example, a disk (e.g., a magnetic disk, not illustrated), which is included in each HDD 3 or 4 to store data about the host unit 2.

The controller 8 controls such a disk and the memory 7 of the HDD 3 or 4.

The controller 8 of each of the HDDs 3 and 4 temporarily stores in the memory 7 the control firmware forwarded by the forwarding section 29a.

After that, upon receipt of an application instruction of control firmware from the application instructing section 28, the controller 8 switches the control firmware (rebooting) so that the control firmware stored in the memory 7 is applied.

Thereby, the control firmware for updating stored in the storing section 24 is applied to the application object HDDs 3 and 4 in response to the instruction issued from the application instructing section 28.

Figure 3:
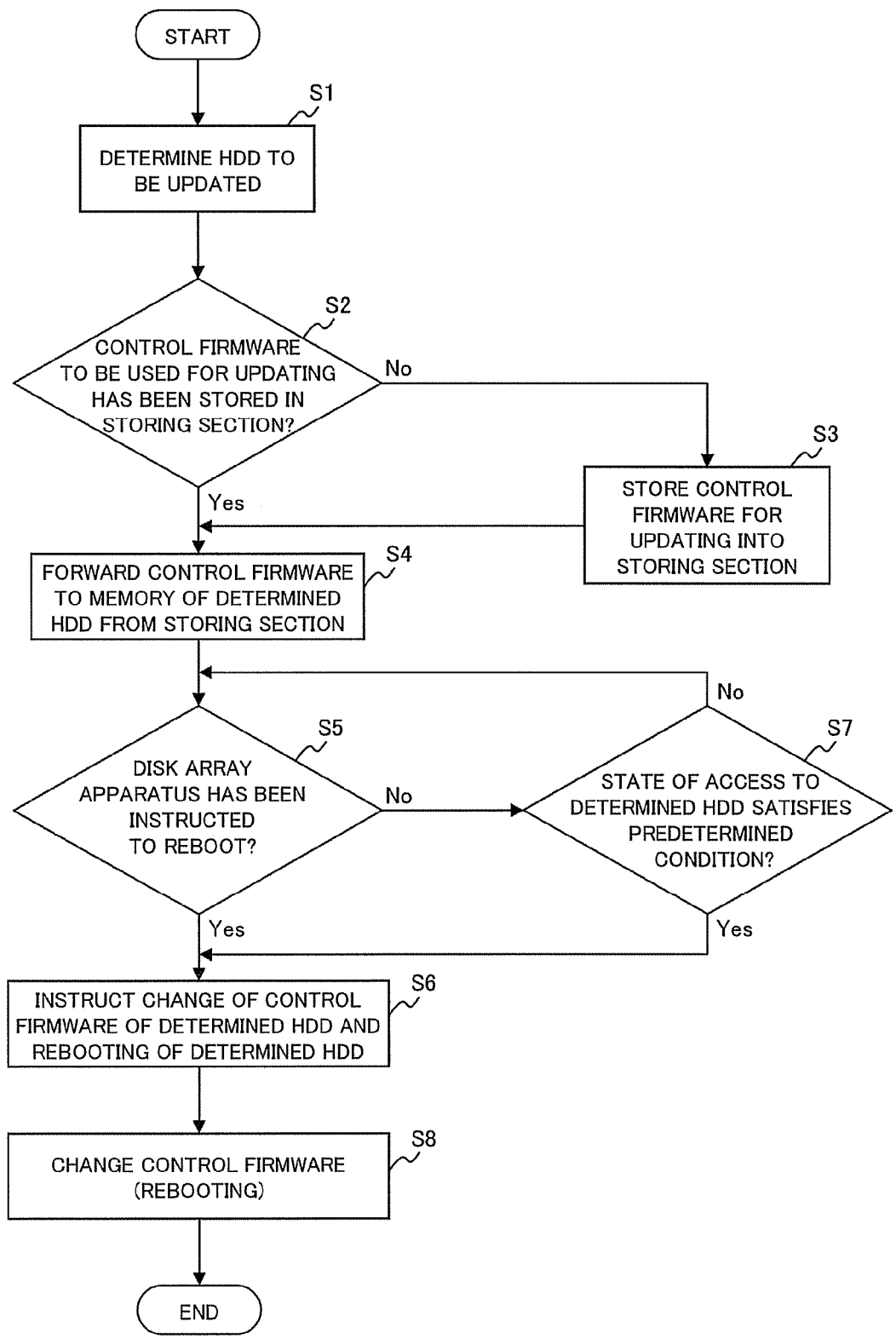
FIGS. 3 and 4 are flow diagrams each depicting examples of a succession of procedural steps of applying control firmware in the first embodiment.

Next, description will now be made in relation to an example of the manner (a method for applying control firmware) of application of control firmware to the HDDs 3 and 4 included in the disk array apparatus 1a with reference to the flow diagram (steps S1-S8) of FIG. 3, which assumes that the application instructing section 28 determines updating object HDDs 3 and 4 on the basis of the assignation from the operator.

First of all, the application instructing section 28 determines update object HDDs 3 and 4 to which the control firmware is to be applied in response to an instruction from the operator (step S1).

Next, the application instructing section 28 judges whether or not the control firmware to be used for updating has already been stored in the storing section 24 (step S2).

If the result of the judgment is negative (No route of step S2), the application instructing section 28 urges, by means of displaying on a monitor (not illustrated) or voice, the operator to store the control firmware, and waits for storing of the control firmware into the storing section 24.

Upon completion of storing of the control firmware for updating into the storing section 24 by the operator (step S3, a storing step), the procedure moves to step S4 to be detailed below.

On the other hand, if the result of the judgment in step S2 is positive (Yes route in step S2), the forwarding section 29a forwards the control firmware for updating to the memories 7 in the updating object HDDs 3 and 4 determined by the application instructing section 28 in step S1 (step S4).

At this time, the forwarding section 29a forwards the control firmware to the memories 7 in the object HDDs 3 and 4 through the unused access paths 5-2 and 6-2, respectively.

The application instructing section 28 then judges whether or not the disk array apparatus 1a has been instructed to reboot (step S5).

Here, the result of the judgment in step S5 is positive (Yes route in step S5), the application instructing section 28 instructs the updating object HDDs 3 and 4 to change the current firmware to the control firmware for updating stored in the memories 7 and to reboot the HDDs 3 and 4 (step S6, an application instructing step).

On the other hand, if the result of the judgment in step S5 is negative (No route in step S5), the application instructing section 28 confirms the states (the monitoring result) of accesses monitored by the monitoring section 26 (step S7). Specifically, the monitoring section 26 monitors a state of access to at least each of the updating object HDDs 3 and 4 determined in step S1 by the application instructing section 28 (a monitoring step).

With reference to the result of monitoring by the monitoring section 26, the application instructing section 28 judges whether or not the state of access to each of the (updating object) HDDs 3 and 4 satisfies the predetermined conditions (Step S7).

If the states of accesses to the HDDs 3 and 4 are not satisfied with the predetermined conditions, that is, if the host unit 2 makes more accesses to each of the updating object HDDs 3 and 4 than the predetermined conditions (No route in step S7), the application instructing section 28 returns to step S5. This means that the application instructing section 28 is in the stand-by state until the disk array apparatus 1a is instructed to reboot or the state of accesses to each of the updating object (assigned) HDDs 3 and 4 satisfy the predetermined conditions.

If the result of the judgment on the access state is positive (Yes route in step S7), the application instructing section 28 instructs the updating object HDDs 3 and 4 to change the current control firmware to the control firmware for updating stored in the memories 7 and reboot (step S6).

Finally, the updating object HDDs 3 and 4 (precisely the controllers 8 thereof) instructed to change the control firmware by the application instructing section 28 switch the current control firmware to the control firmware stored in the memories 7 (a rebooting process) (step S8, an applying step) in obedience to the instruction of step S6 in order to terminate the procedure.

The application instructing section 28 instructs each individual HDD of the determined HDDs 3 and 4 to apply control firmware in the manner described above.

Figure 4:
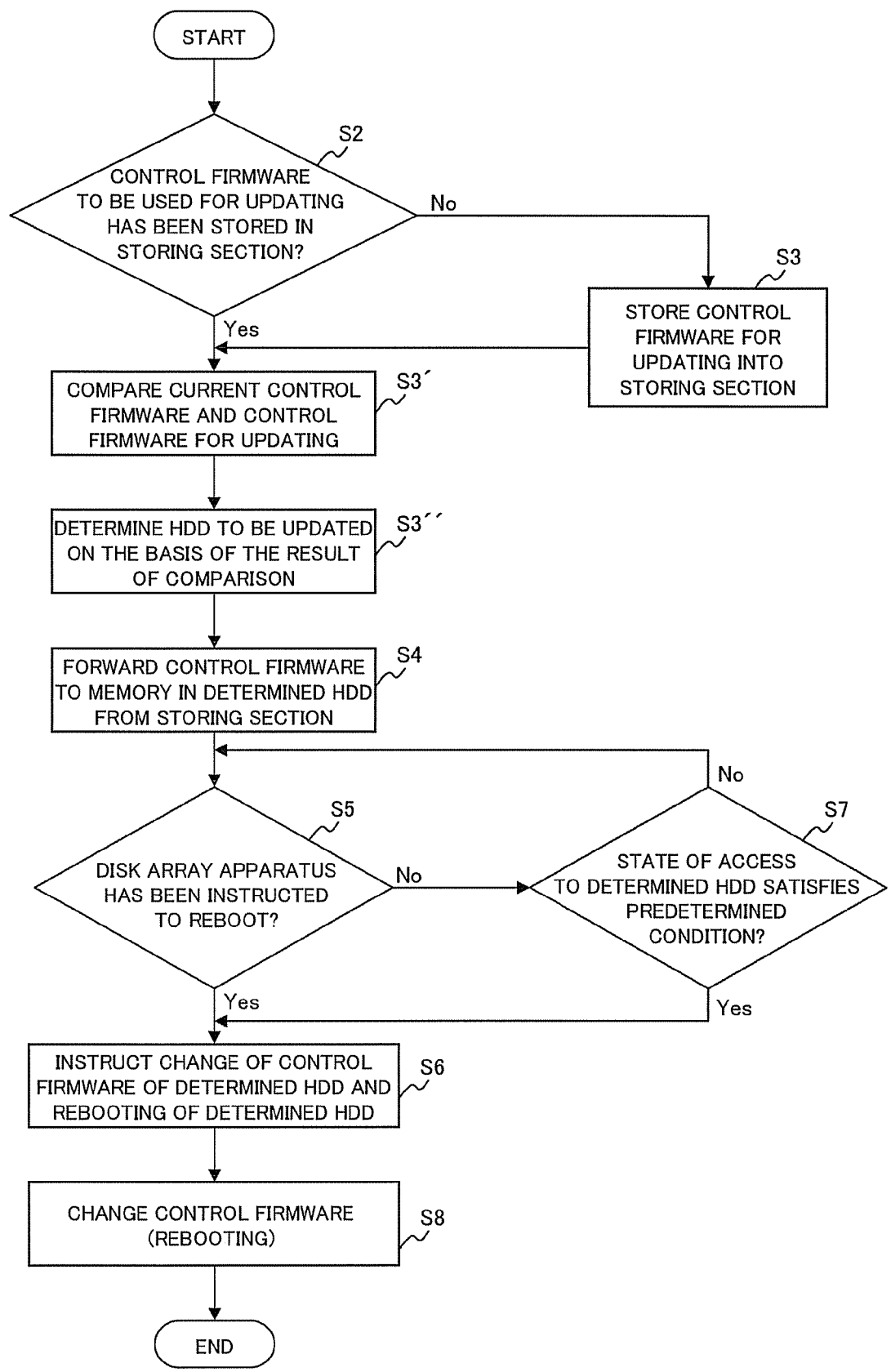

Next, description is made in relation to an example of a procedure (a method) to apply control firmware to the HDDs 3 and 4 included in the disk array apparatus 1a with reference to the flow diagram (steps S2, S3, S3', S3" and S4-S8) of FIG. 4. Like reference numbers designate similar procedural steps throughout several flow diagrams of different illustrated examples.

In the example depicted in FIG. 4, the application instructing section 28 automatically determines updating object HDDs 3 and 4 on the basis of the control firmware for updating. The following description will be made focusing on the different points from the procedure of FIG. 3.

In determination of updating object HDDs 3 and 4 by the application instructing section 28, the first comparing section 27 compares, after the above steps S2 and S3 confirm that the control firmware for updating has been stored in the storing section 24, the information (e.g., the version information) about the current control firmware of the HDDs 3 and 4 with the information about the control firmware for updating (step S3', a comparing step).

For this comparison, the first comparing section 27 obtains the information about the current control firmware of the HDDs 3 and 4 which information is based on the management table stored in the storing section 24; specifies, on the basis of the kinds and the versions of HDDs 3 and 4 retained in the management table, HDDs 3 and 4 of the kind to which the control firmware is applicable; and performs the above comparison procedure only on the specified HDDs 3 and 4 of the applicable kind.

On the basis of the result of the comparison by the first comparing section 27, the application instructing section 28 determines the updating object HDDs 3 and 4 (step S3").

Specifically, if the comparison by the first comparing section 27 concludes that the current control firmware of the HDDs 3 and 4 is older than the control firmware stored in the storing section 24, the application instructing section 28 determines the HDDs 3 and 4 to be updating objects (step S3").

Conversely, if the comparison by the first comparing section 27 in step S3' concludes that the version of the current control firmware of the HDDs 3 and 4 is newer than or identical to that of the control firmware stored in the storing section 24, the application instructing section 28 does not determine the HDDs 3 and 4 to be updating objects (step S3").

After that, the disk array apparatus 1a carries out procedural steps S4 to S8 in the same manner as those described with reference to FIG. 3, so that the control firmware of the updating object HDDs 3 and 4 is updated.

As described above, in the disk array apparatus 1a of the first embodiment, the disk array controller 20a includes: the storing section 24 that stores control firmware for updating; the application instructing section 28 that instructs the updating object HDDs 3 and 4 to apply the control firmware which instruction is based on the result of monitoring by the monitoring section 26. In response to the instruction, the control firmware for updating is applied to the updating object HDDs 3 and 4. Therefore, even while the disk array apparatus 1a is operating, the control firmware of the HDDs 3 and 4 can be applied (updated) in conformity to the states of access to the HDDs 3 and 4. Further, the updating process of each of the HDDs 3 and 4 is automatically performed without requiring operation by the operator, so that the load on the operator can be greatly reduced.

The application instructing section 28 issues, through the access paths 5-2 and 6-2 which are different from ordinary access path 5-1 and 6-1 of the host unit 2, the application instruction to the updating object HDDs 3 and 4. Consequently, the application instruction can be surely issued to the updating object HDDs 3 and 4 without impeding the throughput of the host unit 2.

Further, the forwarding section 29*a* also forwards, through the access paths 5-2 and 6-2 which are different from ordinary access paths 5-1 and 6-1 of the host unit 2, the control firmware for updating to the updating object HDDs 3 and 4. Consequently, the control firmware can be surely forwarded to the updating object HDDs 3 and 4 without impeding the throughput of the host unit 2.

Since the forwarding section 29*a* instructs that the control firmware is forwarded to the HDDs 3 and 4 prior to at least issuing of the application instruction the application instructing section 28 issues to the HDDs 3 and 4, the HDDs 3 and 4 can surely update the control firmware in response to the instruction from the application instructing section 28.

Upon storing of the latest control firmware for updating into the storing section 24, the application instructing section 28 determines, on the basis of the result of the comparison by the first comparing section 27, HDDs 3 and 4 that require updating. Accordingly, the operator can update the control firmware of the HDDs 3 and 4 that require updating by simply storing the control firmware for updating into the storing section 24, so that the load on the operator can be greatly reduced.

(2) Second Embodiment

Next, description will now be made in relation to the configuration of a disk array apparatus 1*b* according to a second embodiment with reference to the block diagrams of FIGS. 1 and 2.

As shown in FIGS. 1 and 2, the disk array apparatus 1*b* is identical in configuration to the disk array apparatus 1*a* of the first embodiment, except for the configuration of a forwarding section 29*b* in a disk array controller 20*b*. Therefore, detailed description will be made for the forwarding section 29*b* and description for the remaining configuration will be omitted here.

In the disk array apparatus 1*a* of the foregoing first embodiment, upon storing of the control firmware used for updating into the storing section 24, the forwarding section 29*b* appropriately forwards the stored control firmware to the HDDs 3 and 4. On the other hand, the forwarding section 29*b* of the second embodiment is configured to forward, on the basis of the result of the monitoring by the monitoring section 26, the control firmware along with an instruction from the application instructing section 28 to the HDDs 3 and 4.

Figure 5:
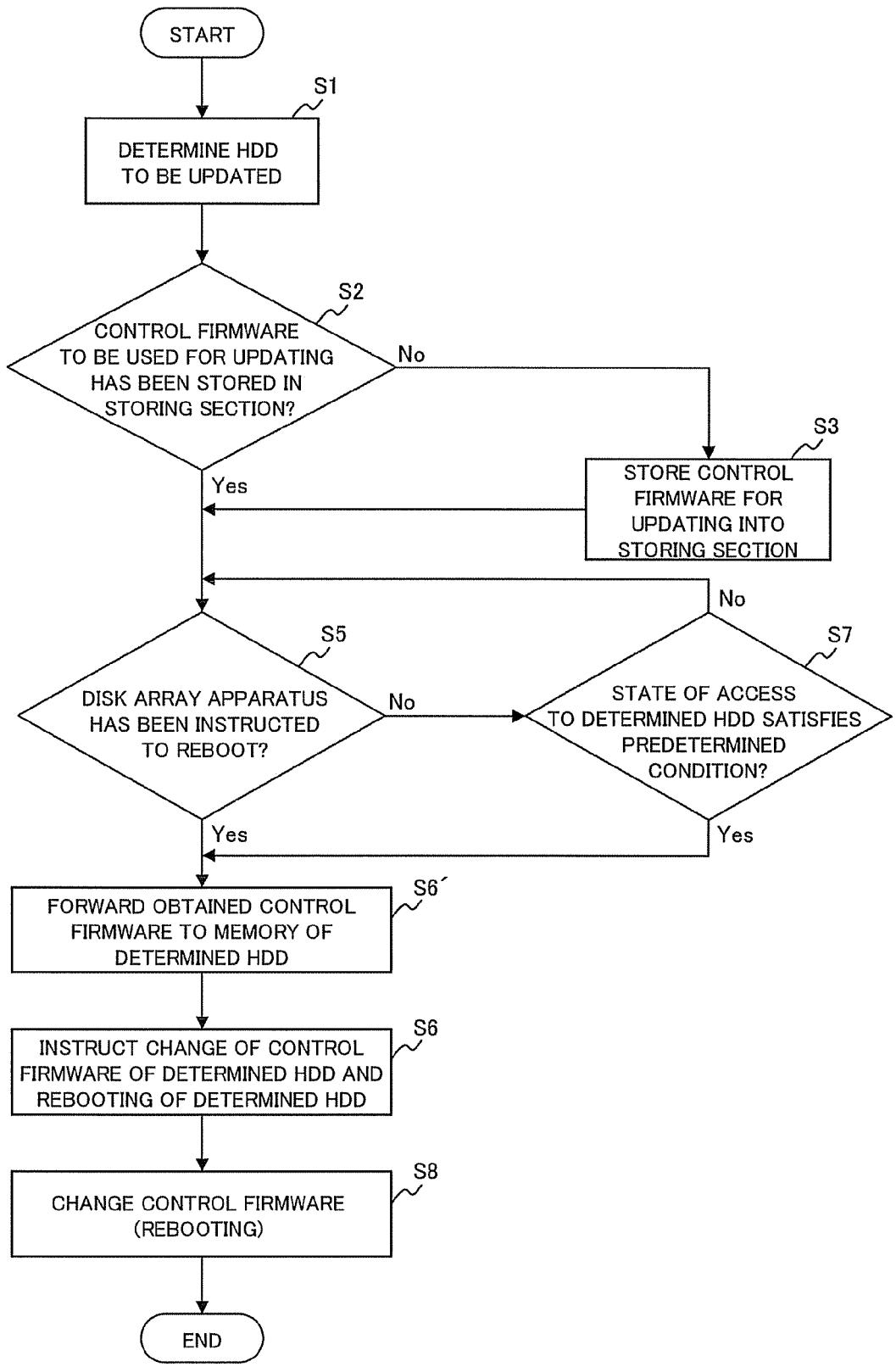
FIG. 5 is a flow diagram depicting an example of a succession of procedural steps of applying control firmware in the second embodiment.

Specifically, as depicted in the flow diagrams (steps S1~S3, S5, S6', and S6~S8) of FIG. 5, prior to the application instruction to the updating object HDDs 3 and 4 from the application instructing section 28 (step S6), the forwarding section 29*b* forwards, on the basis of the result of the judgment on a rebooting instruction in step S5 or the result of the monitoring of an access state in step S7, the control firmware for updating stored in the storing section 24 to the HDDs 3 and 4 (step S6').

As described above, in the disk array apparatus 1*b* of the second embodiment, the forwarding section 29*b* forwards the control firmware for updating to the memories 7 of the updating object HDDs 3 and 4 prior to issue of the application instruction to the HDDs 3 and 4 in question from the application instructing section 28. This can realize the updating of the control firmware of the HDDs 3 and 4 surely preventing the normal operation of access from the host unit 2 from being hindered.

(3) Third Embodiment

A disk array apparatus 1*c* according to the third embodiment will now be described with reference to block diagrams FIGS. 1 and 6. Like reference numbers designate similar parts and elements throughout FIG. 6 and the drawings detailed above.

Figure 6:
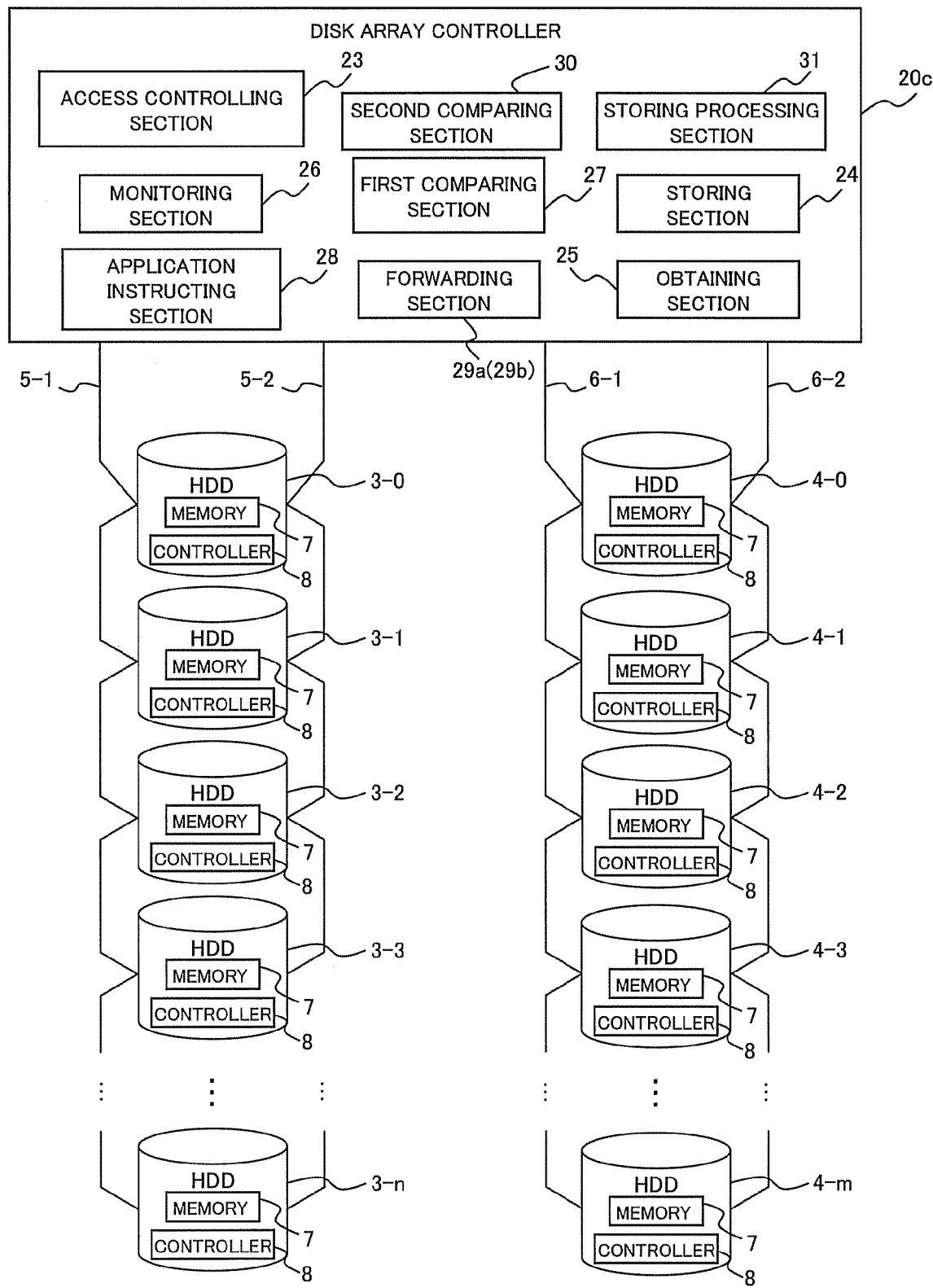
FIG. 6 is a diagram schematically illustrating the configuration of a main part of a disk array apparatus according to the third embodiment.

As depicted in FIGS. 1 and 6, the disk array apparatus 1*c* further includes a second comparing section (comparing section) 30 and a storing processing section 31 in addition to the elements included in the disk array controller 20*a* of the first embodiment.

Specifically, if the control firmware of the HDD 3 or 4 that has been inserted through hot swapping is the latest, the disk array apparatus 1*c* obtains the control firmware from the inserted HDD 3 or 4 and uses the obtained control firmware as control firmware for updating that is to be applied to other HDDs 3 and 4.

Accordingly, the third embodiment will be detailed focusing on the different points from the first embodiment.

After one of the HDDs 3 and 4 is subjected to hot swapping during the operation of the disk array apparatus 1*c*, the obtaining section 25 obtains information about the control firmware of the HDD 3 or 4 through the hot swapping. The information obtained from the HDD 3 or 4 inserted by the obtaining section 25 is exemplified by the version or the date of creation of the control firmware.

The second comparing section 30 compares the information about the applied control firmware which information is obtained from HDD 3 or 4 by the obtaining section 25 with information about the control firmware stored in the storing section 24.

The control firmware stored in the storing section 24 represents not only firmware currently stored in the storing section 24 but also firmware that should be stored but actually has not yet been stored.

For example, shortly after the disk array apparatus 1*c* starts operating, the storing section 24 may not store control firmware. In such a case, the latest firmware of the HDDs 3 and 4 corresponds to the control firmware that is to be stored in the storing section 24.

In other words, the control firmware stored in the storing section 24 is the latest control firmware among one or more pieces of firmware of the HDDs 3 and 4 that have been connected and that have been operating other than HDDs 3 and 4 inserted by the hot swapping. Therefore, the second comparing section 30 specifies the control firmware that should be stored into the storing section 24 on the basis of the management table in the storing section 24. If the HDDs 3 and 4 are different in kind, the pieces of firmware identical in number with the kinds should be stored in the storing section 24.

The second comparing section 30 performs the above comparison for each kind of HDDs 3 and 4.

If the comparison by the second comparing section 30 concludes that the control firmware of the hot-swapped HDD 3 or 4 is newer than that stored in the storing section 24, the storing processing section 31 stores the control firmware of the hot-swapped HDD 3 or 4 into the storing section 24 to serve as the control firmware for updating.

Upon storing of the new control firmware into the storing section 24 by the storing processing section 31, the application instructing section 28 instructs HDDs 3 and 4 operating under the control of older control firmware to apply the new control firmware in the same manner as detailed in either the first or the second embodiment.

Conversely, if the comparison by the second comparing section 30 concludes that the control firmware of the hot-swapped HDD 3 or 4 is older than that stored in the storing section 24, the application instructing section 28 instructs the hot-swapped HDD 3 or 4 to apply the control firmware for updating stored in the storing section 24 in the same manner as detailed in either the first or the second embodiment.

Here, description will now be made using an example of a procedure (a method for application of control firmware) of application of control firmware to the HDDs 3 and 4 in the disk array apparatus 1c with reference to flow diagram (steps S10-S15, and S5-S8) FIG. 7. Like reference numbers designate similar procedural steps throughout several views of different illustrated examples.

Upon completion of hot swapping of HDD 3 or 4 (step S10), the obtaining section 25 obtains information about the control firmware of the HDD 3 or 4 (hereinafter called the "inserted HDD") that has been inserted through the hot swapping (step S11, the obtaining step).

The second comparing section 30 then compares the information about the control firmware of the inserted HDD 3 or 4 which information has been obtained by the obtaining section 25 with information about control firmware (that is stored in the storing section 24) of the HDDs 3 and 4 that is identical in kind with the inserted HDD 3 or 4 (step S12, the comparing step).

In other words, the second comparing section 30 confirms through the comparison of the information about control firmware whether or not the control firmware of the inserted HDD 3 or 4 is the latest.

If the control firmware of the inserted HDD 3 or 4 is older than or the same in oldness as the control firmware stored in the storing section 24, in other words, if the control firmware of the inserted HDD 3 or 4 is not the latest (No route in step S12), a disk array controller 20c carries out the updating procedure on the control firmware of the inserted HDD 3 or 4 in the manner described in the first and the second embodiments (step S13) to complete the updating.

On the other hand, if the control firmware of the inserted HDD 3 or 4 is newer than the control firmware stored in the storing section 24, in other words, if the control firmware of the inserted HDD 3 or 4 is the latest (Yes route in step S12), the storing processing section 31 obtains the control firmware from the inserted HDD 3 or 4 and stores the obtained control firmware into the storing section 24 (step S14, the storing process step).

In succession, the forwarding section 29a forwards the control firmware stored in the storing section 24 in the above step S14 into HDDs 3 and 4 which are the same in kind as the inserted HDD 3 or 4.

In other words, the application instructing section 28 specifies HDDs 3 and 4 as being the same in kind as the inserted HDD 3 or 4 with reference to the management table in the storing section 24 and determines the specified HDDs 3 and 4 to be the updating object HDDs 3 and 4.

After that, the disk array controller 20c carries out the application of the control firmware to the updating object HDDs 3 and 4 determined by the application instructing section 28 in the same manner as that performed in the first embodiment (see FIG. 3, for example) (steps S5-S8).

As described above, the disk array apparatus 1c of the third embodiment can attain the same effects as the first and the second embodiments. In addition, if the control firmware of the inserted HDD 3 or 4 through hot swapping is newer than the control firmware stored in the storing section 24, the storing processing section 31 stores the control firmware of the inserted HDD 3 or 4 into the storing section 24, so that the latest control firmware can be automatically registered in the storing section 24 simply through hot swapping to insert a HDD 3 or 4 operating under the latest control firmware by the operator. This further reduces load on the operator.

The application instructing section 28 instructs HDDs 3 and 4 operating under the control of the control firmware which is older than the control firmware that storing processing section 31 has stored into the storing section 24 to apply the control firmware stored in the storing section 24. Thereby, simple hot swapping to insert a HDD 3 or 4 operating under the control of the latest control firmware by the operator can update the control firmware of all HDDs 3 and 4 that are the same in kind as the inserted HDD 3 or 4. With this configuration, the control firmware can be easily updated in a disk array apparatus even if the apparatus has hundreds or thousands of HDDs 3 and 4, so that load on the operator can be greatly reduced.

(4) Others

The present invention should by no means be limited to the foregoing embodiments, and various combinations and modifications can be suggested without departing from the gist of the invention.

Figure 7:
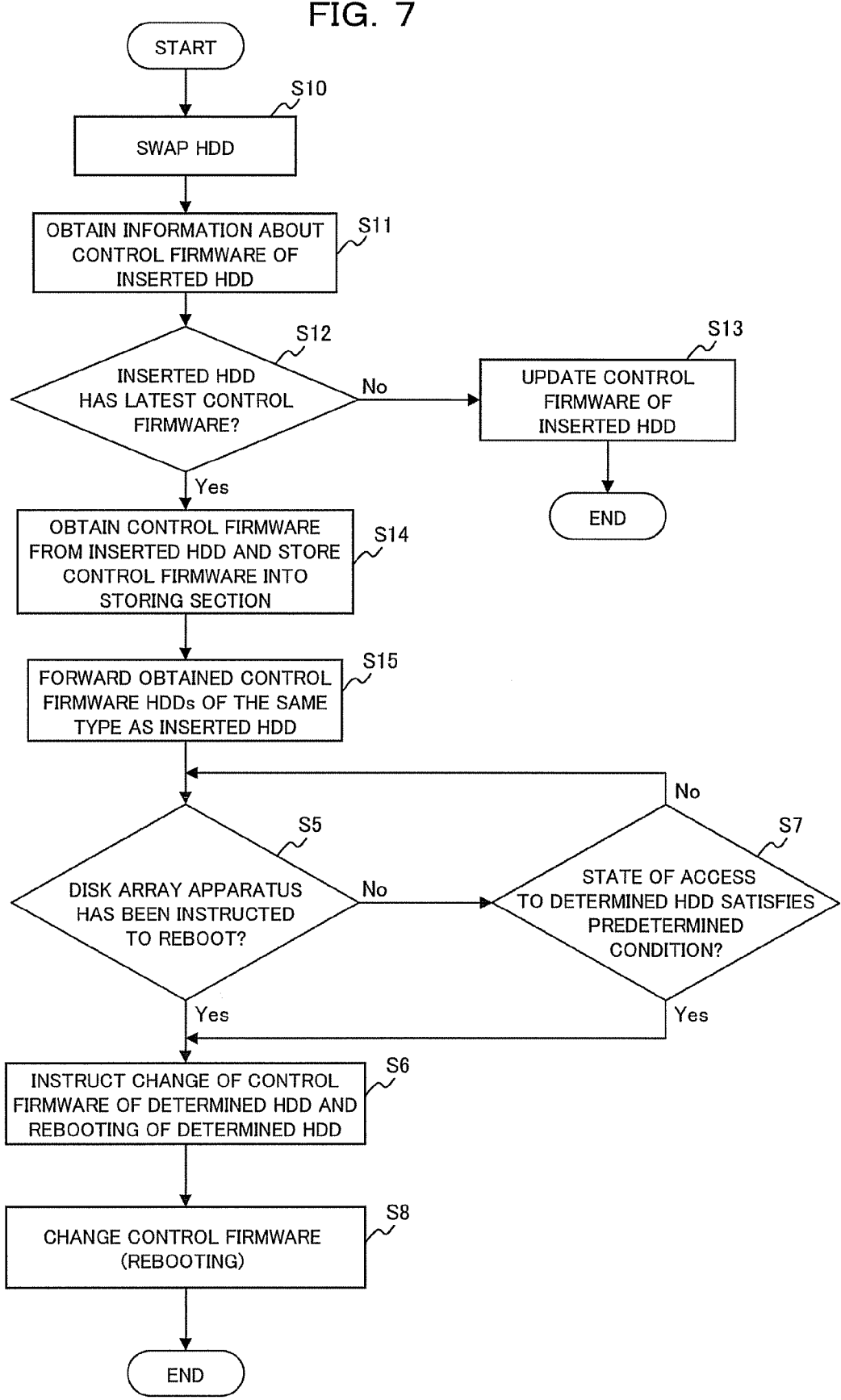
FIG. 7 is a flow diagram depicting an example of a succession of procedural steps of applying control firmware in the third embodiment.
Figure 8:
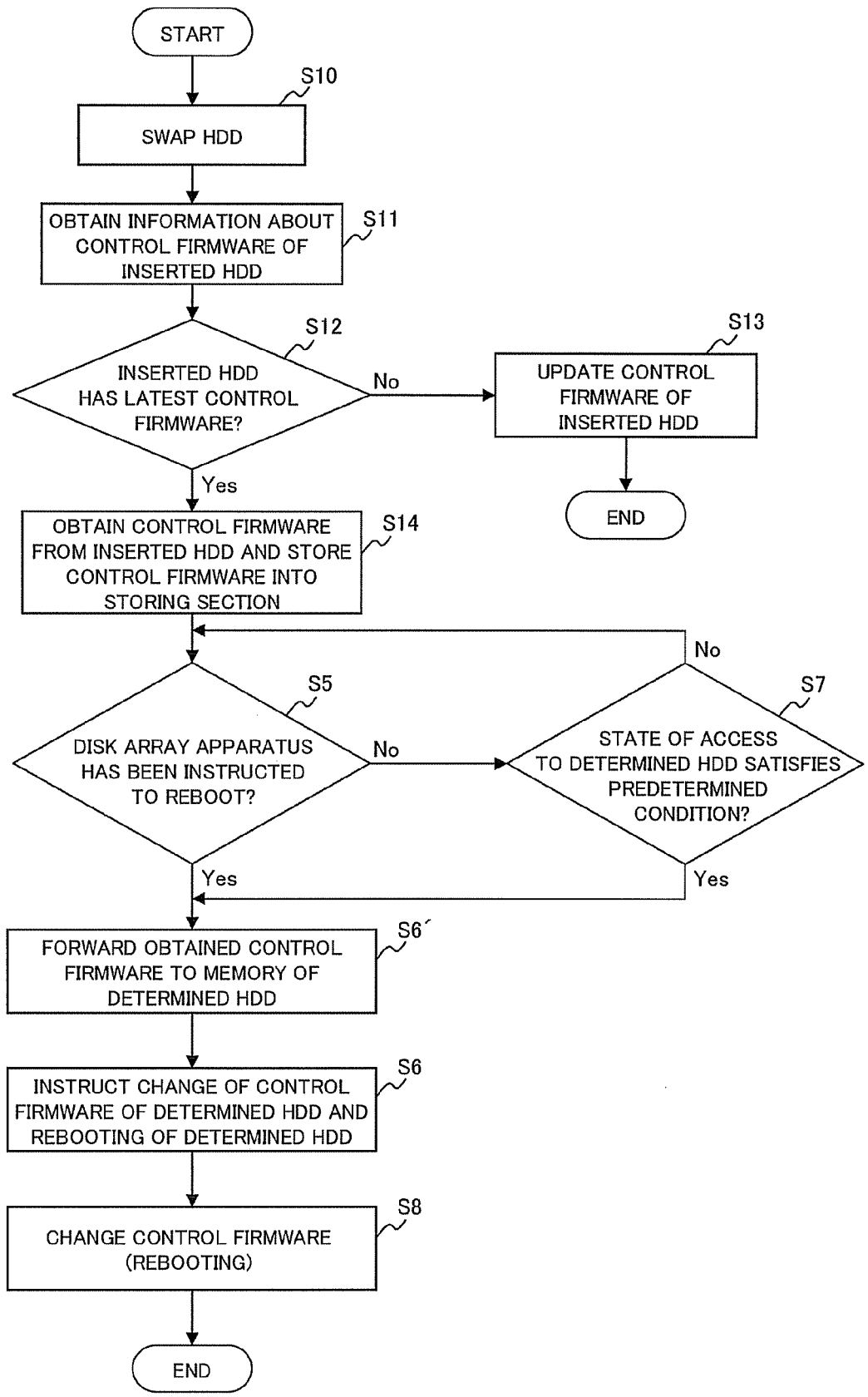
FIG. 8 is a flow diagram depicting an example of a succession of procedural steps of applying control firmware according to a modification.

For example, in the third embodiment, after the storing processing section 31 stores the control firmware into the storing section 24, the forwarding section 29a forwards the stored control firmware to suitable HDDs 3 and 4 as depicted in FIG. 7. However, the present invention is not limited to this. Alternatively, as depicted in flow diagram (steps S10~S14, S5, S6', and S6~S8) FIG. 8, the forwarding section 29b may forward the control firmware to appropriate HDDs 3 and 4 in accordance with the result of the monitoring by the monitoring section 26 (i.e., the access state) likewise the second embodiment. Like reference numbers designate similar procedural steps throughout FIG. 8 and the foregoing drawings.

In the foregoing embodiments, the information about control firmware is version information or the date of creation, to which the present invention limits the information. Alternatively, any information that can discriminate the oldness can be the information about control firmware.

Further, the forwarding section 29a and 29b in the first to the third embodiments forwards the control firmware for updating to the memories 7 of the updating object HDDs 3 and 4. However, the present invention is not limited to this. Alternatively, the updating object HDDs 3 and 4 may read the control firmware for updating from the storing section 24. In this case, the application instructing section 28, for example, preferably instructs the updating object HDDs 3 and 4 to start reading in conformity to the state of access to the updating object HDDs 3 and 4.

In the foregoing embodiments, the predetermined conditions to prompt the application instructing section 28 to issue an application instruction are that the host unit 2 has not made an access to each of HDDs 3 and 4 continuously for a predetermined time period, or that the host unit 2 has made accesses to each of the HDDs 3 and 4 less than a predetermined threshold for a predetermined time period. However, the present invention does not limit the predetermined conditions to these, and the predetermined conditions are preferably set not to impede the operations responsive to requests from the host unit 2. For example, if the disk array apparatus operates in an ecology mode in which the operation time of the HDDs 3 and 4 is scheduling managed and the motors of the HDDs 3 and 4 are usually stopped but are activated in response to access from the host unit 2, the application instructing section 28 may issue the application instruction when the motor is about to be stopped.

The functions of the access controlling section 23, the obtaining section 25, the monitoring section 26, the first comparing section 27, the application instructing section 28, the forwarding sections 29a and 29b, the second comparing section 30, and the storing processing section 31 may be realized through execution of a predetermined application program (a control firmware application program) by a computer (exemplified by a CPU, an information processor and various other terminals).

The program may be provided in the form of being stored in a computer-readable recording medium, such as a flexible disk, a CD (e.g., CD-ROM, CD-R, CD-RW), a DVD (e.g., DVD-ROM, DVD-RAM, DVD-R, DVD+R, DVD-RW, DVE+RW). In this case, the computer may read the program from the recording medium and send the read program to an internal or external memory to store for use. Further alternatively, the program may be recorded in a memory device (a recording medium), such as a magnetic disk, an optical disk or a magneto-optical disk, and be provided to the computer from the memory device through a communication path.

Here, a computer is a concept of a combination of hardware and an OS and means hardware which operates under control of the OS. Otherwise, if an application program operates hardware independently of an OS, the hardware corresponds to the computer. Hardware includes at least a microprocessor such as a CPU and means to read a computer program recorded in a recording medium.

The application program serving as the above control firmware application program includes a program code to prompt a computer described above to realize the functions of the access controlling section 23, the obtaining section 25, the monitoring section 26, the first comparing section 27, the application instructing section 28, the forwarding sections 29a and 29b, the second comparing section 30, and the storing processing section 31. Alternatively, the functions may partially be realized by the OS, not by the application program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A disk array apparatus comprising a plurality of storage units that store data transmitted from a host unit, and a controlling unit controlling said plurality of storage units,
    said controlling unit comprising:
        a storing section storing first control firmware that is to be applied to one or more first storage units of said plurality of storage units, each said first storage units being connected to the said controlling unit via a number of access paths;
        a monitoring section for monitoring a state of access to each of said first storage units; and
        an application instructing section instructing, if the result of the monitoring by said monitoring section proves that each said first storage unit is not continuously accessed for a predetermined time period or that the number of accesses to each said first storage unit for a predetermined time period is a threshold or less, each said first storage unit to apply the first control firmware,
    said application instructing section instructing, through a first access path of the access paths which is different from a second access path of the access paths that connects each said first storage unit to the host unit, each said first storage unit via said controlling unit to apply the first control firmware,
    in response to the instructing by said application instructing section, the first control firmware being applied to each said first storage unit.

2. A disk array apparatus according to claim 1, further comprising a forwarding section forwarding the first control firmware stored in said storing section to each said first storage unit through said first access path.

3. A disk array apparatus according to claim 2, said forwarding section forwarding, on the basis of the result of the monitoring by said monitoring section, the first control firmware to each said first storage unit prior to the instructing by said application instructing section.

4. A disk array apparatus according to claim 1, further comprising:
    an obtaining section obtaining information about second control firmware of a second storage unit for which one of said plurality of storage units has been swapped while said disk array apparatus is operating; and
    a comparing section comparing the information about said second control firmware obtained from the second storage unit with information about the first control firmware stored in said storing section,
    said application instructing section instructing each said first storage unit and said second storage unit to apply control firmware conforming to the result of the comparing by said comparing section.

5. A disk array apparatus according to claim 4, wherein, if said comparing section judges, as the result of the comparing, that the second control firmware of said second storage unit is older than the first control firmware stored in said storing section, said application instructing section instructs said second storage unit to apply the first control firmware.

6. A disk array apparatus according to claim 4, further comprising a storing processing section storing, if said comparing section judges, as the result of the comparing, that the second control firmware of said second storage unit is newer than the first control firmware stored in said storing section, the second control firmware into said storing section.

7. A disk array apparatus according to claim 6, said application instructing section instructing one or more storage units, which are operating under the control of firmware older than the second control firmware among said plurality of said storage units, to apply the second control firmware stored by said storing processing section into said storing section.

8. A method for applying, in a disk array apparatus comprising a plurality of storage units, control firmware to the plurality of storage units that store data transmitted from a host unit, said method comprising:
    storing into a storing section first control firmware that is to be applied to one or more first storage units of the plurality of the storage units;
    monitoring a state of access to each of said first storage units;
    instructing, through a first access path different from a second access path that connects each said first storage unit to the host unit, that the first control firmware is to be applied to each said first storage unit, the instructing being issued if the result of the monitoring proves that each said first storage unit is not continuously accessed for a predetermined time period or that the number of accesses to each said first storage unit for a predetermined time period is a threshold or less; and applying, in response to the instructing, the first control firmware stored to each said first storage unit.

9. A method for applying control firmware according to claim 8, further comprising:
obtaining information about second control firmware of a second storage unit for which one of the plurality of storage units has been swapped while the disk array apparatus is operating; and
comparing the information about the second control firmware obtained from the second storage unit with information about the first control firmware stored in the storing section, wherein
the instructing instructs, on the basis of the result of the comparing, that firmware is applied to each said first storage unit and to the second storage unit.

10. A method for applying control firmware according to claim 9, wherein if the comparing judges that the second control firmware of the second storage unit is older than the first control firmware stored in the storing section, the instructing instructs that the first control firmware is to be applied to the second storage unit.

11. A method for applying control firmware according to claim 9, further comprising storing, if the comparing judges that the second control firmware of the second storage unit is newer than the first control firmware stored in said storing section, the second control firmware into the storing section.

12. A method for applying control firmware according to claim 11, wherein the instructing instructs that the second control firmware stored in the storing section is to be applied to one or more storage units operating under control firmware older than the second control firmware among the plurality of said storage units.

13. A controlling unit, in a disk array apparatus comprising a plurality of storage units, for controlling application of control firmware to the plurality of storage units that store data transmitted from a host unit, said controlling unit comprising:
a storing section storing first control firmware that is to be applied to one or more first storage units of the plurality of storage units;
a monitoring section for monitoring a state of access to each of said first storage units; and
an application instructing section instructing, through an access path different from an access path that connects the each said first storage unit to the host unit, each said first storage unit to apply the first control firmware, the instructing being issued if the result of the monitoring by said monitoring section proves that each said first storage unit is not continuously accessed for a predetermined time period or that said the number of accesses to each said first storage unit for a predetermined time period is a threshold or less.

14. A controlling unit for controlling application of control firmware according to claim 13, further comprising:
an obtaining section obtaining information about second control firmware of a second storage unit for which one of the plurality of storage units has been swapped while the disk array apparatus is operating; and
a comparing section comparing the information about said second control firmware obtained from the second storage unit with information about the first control firmware stored in said storing section,
said application instructing section instructing each said first storage unit and said second storage unit to apply firmware conforming to the result of the comparing by said comparing section.

15. A controlling unit for controlling application of control firmware according to claim 14, wherein, if said comparing section judges, as the result of the comparing, that the second control firmware of said second storage unit is older than the first control firmware stored in said storing section, said application instructing section instructs that the first control firmware is to be applied to said second storage unit.

16. A controlling unit for controlling application of control firmware according to claim 14, further comprising a storing processing section storing, if said comparing section judges, as the result of the comparing, that the second control firmware of said second storage unit is newer than the first control firmware stored in said storing section, the second control firmware into said storing section.

17. A controlling unit for controlling application of control firmware according to claim 16, said application instructing section instructing one or more storage units, which are operating under the control of firmware older than the second control firmware among said plurality of said storage units, to apply the second control firmware stored by said storing processing section into said storing section.

18. A disk array apparatus comprising:
a plurality of storage units that store data transmitted from a host unit;
a processor controlling said plurality of storage units; and
a memory storing first control firmware that is to be applied to one or more first storage units of said plurality of storage units, each said first storage units being connected to the said processor via a number of access paths, wherein:
said processor
monitors a state of access to each of said first storage units,
if the result of the monitoring proves that each said first storage unit is not continuously accessed for a predetermined time period or that the number of accesses to each said first storage unit for a predetermined time period is a threshold or less, each said first storage unit to apply the first control firmware, instructs, through a first access path of the access paths which is different from a second access path of the access paths that connects each said first storage unit to the host unit, each said first storage unit to apply the first control firmware, and
applies, in response to the instructing, the first control firmware stored in said memory to each said first storage unit.

* * * * *